United States Patent
Thomson et al.

(10) Patent No.: US 7,009,656 B2
(45) Date of Patent: Mar. 7, 2006

(54) VIDEO SIGNAL PROCESSING

(75) Inventors: Roderick M. Thomson, Christchurch (NZ); David M. Banks, Liss (GB)

(73) Assignee: Snell & Wilcox Limited, Twickenham (GB)

(*) Notice: Subject to any disclaimer, the term of this patent is extended or adjusted under 35 U.S.C. 154(b) by 563 days.

(21) Appl. No.: 10/220,437

(22) PCT Filed: Apr. 9, 2001

(86) PCT No.: PCT/GB01/01609

§ 371 (c)(1),
(2), (4) Date: Jan. 7, 2003

(87) PCT Pub. No.: WO01/78389

PCT Pub. Date: Oct. 18, 2001

(65) Prior Publication Data

US 2004/0012685 A1    Jan. 22, 2004

(51) Int. Cl.
*H04N 7/01* (2006.01)
(52) U.S. Cl. ................... 348/452; 348/620
(58) Field of Classification Search ........ 348/451, 348/452, 620, 699, 700, 607; H04N 7/01, H04N 5/21
See application file for complete search history.

(56) References Cited

U.S. PATENT DOCUMENTS 5,546,130 A * 8/1996 Hackett et al. ............ 348/447

FOREIGN PATENT DOCUMENTS

| EP | 0 187 641 A1 | 1/1986 |
| EP | 0 390 660 A1 | 3/1990 |
| EP | 0 395 275 A2 | 4/1990 |
| EP | 0702880 B1 * | 5/1999 |
| EP | 0 210 862 A2 | 7/2002 |

OTHER PUBLICATIONS

Copy of International Search Report for Application No. PCT/GB01/01609, dated Aug. 16, 2001, 2 pages.

* cited by examiner

Primary Examiner—Sherrie Hsia
(74) Attorney, Agent, or Firm—Sterne, Kessler, Goldstein & Fox P.L.L.C.

(57) ABSTRACT

In video processing, a motion compensated process and an equivalent linear process are performed on an input signal, the processing errors of which are computed and compared. The comparison is then used to control a mix between the outputs of the two processes to produce an output signal.

10 Claims, 4 Drawing Sheets

VIDEO SIGNAL PROCESSING

BACKGROUND OF THE INVENTION

1. Field of the Invention

This invention relates to video processing and particularly to motion compensation of video processes.

2. Background Art

It is a well-known technique in video processing, to identify a motion vector for each pixel and to shift pixels in accordance with those vectors. Such motion compensation is of benefit in myriad video processes, of which standards conversion is a good example. A motion compensated process will be expected to perform considerably better than the equivalent linear process, although at a substantial extra cost in terms of hardware complexity or software processing requirement.

It is further known in simpler arrangements to switch between two processes, one spatial and one temporal, on the basis of whether motion is detected. This has the advantage of avoiding motion smear by switching to spatial processing, but typically suffers from adaption artefacts.

It is an object of one aspect of the present invention to provide a method of taking motion into account, which is less complex and involves less processing than full motion compensation, but which nonetheless offers significant improvements over the equivalent linear process.

There is disclosed in EP O 702 880 a method of reducing the deleterious effects of motion in a video signal process, comprising the steps of conducting the video signal process on a video signal at high bandwidth without motion compensation; conducting a like video signal process without motion compensation at low bandwidth to produce a low bandwidth control signal; conducting a similar video signal process with motion compensation at low bandwidth to produce a low bandwidth motion compensated signal; comparing the control and motion compensated signals to produce an error signal and subtracting the error signal in the high bandwidth video signal process.

SUMMARY OF THE INVENTION

The present invention consists in one aspect in a method of video processing comprising the steps of receiving an input signal; conducting a motion compensated video process on the input signal to form a motion compensated signal; conducting an equivalent linear process on the input signal to form a linear signal; forming a measure of the relative errors in the motion compensated process and the linear process respectively; and utilising said measure to form an output signal which is a mix between the motion compensated signal and the linear signal, the relative proportions of the motion compensated signal and linear signal in said mix being determined by said measure.

BRIEF DESCRIPTION OF THE DRAWINGS/FIGURES

The invention will now be described by way of example with reference to the accompanying drawings, in which.

DETAILED DESCRIPTION OF THE INVENTION

Figure 1:
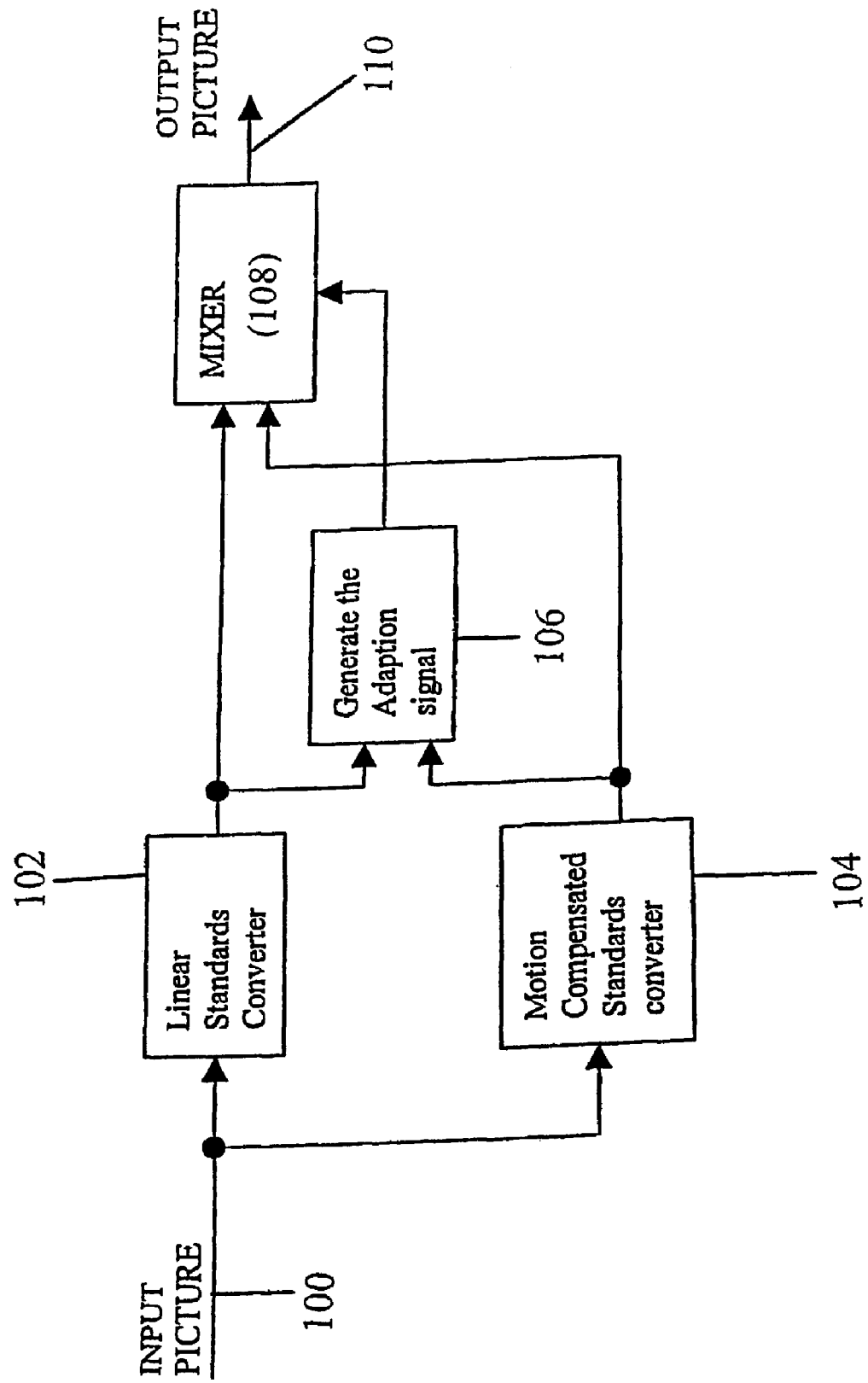
FIG. 1 is a block diagram of apparatus according to an embodiment of the present invention.

Referring initially to FIG. 1, in one embodiment, the system generates two standards converted images (one linear conversion (102) and one motion compensated (104)) from an input signal (100). An adaption signal is then generated (106) by comparison of the converter outputs, and is used to control the mixing (108) of the two signals to produce the output signal (110).

In this manner, the two different conversion signals are compared, in order to determine which is more appropriate for the material currently being processed. The comparison controls the mix, so that, for example, at instances where motion compensated standards conversion gives better results, the signal from block 104 is preferably used as a higher proportion of the mix. The system thus produces the optimum output from a mix of the two different converters, rather than simply switching from one to the other.

Reference is directed to EP 0 702 880 for more detail of a method of generating two standards converted images, one linear conversion and one motion compensated.

Figure 2:
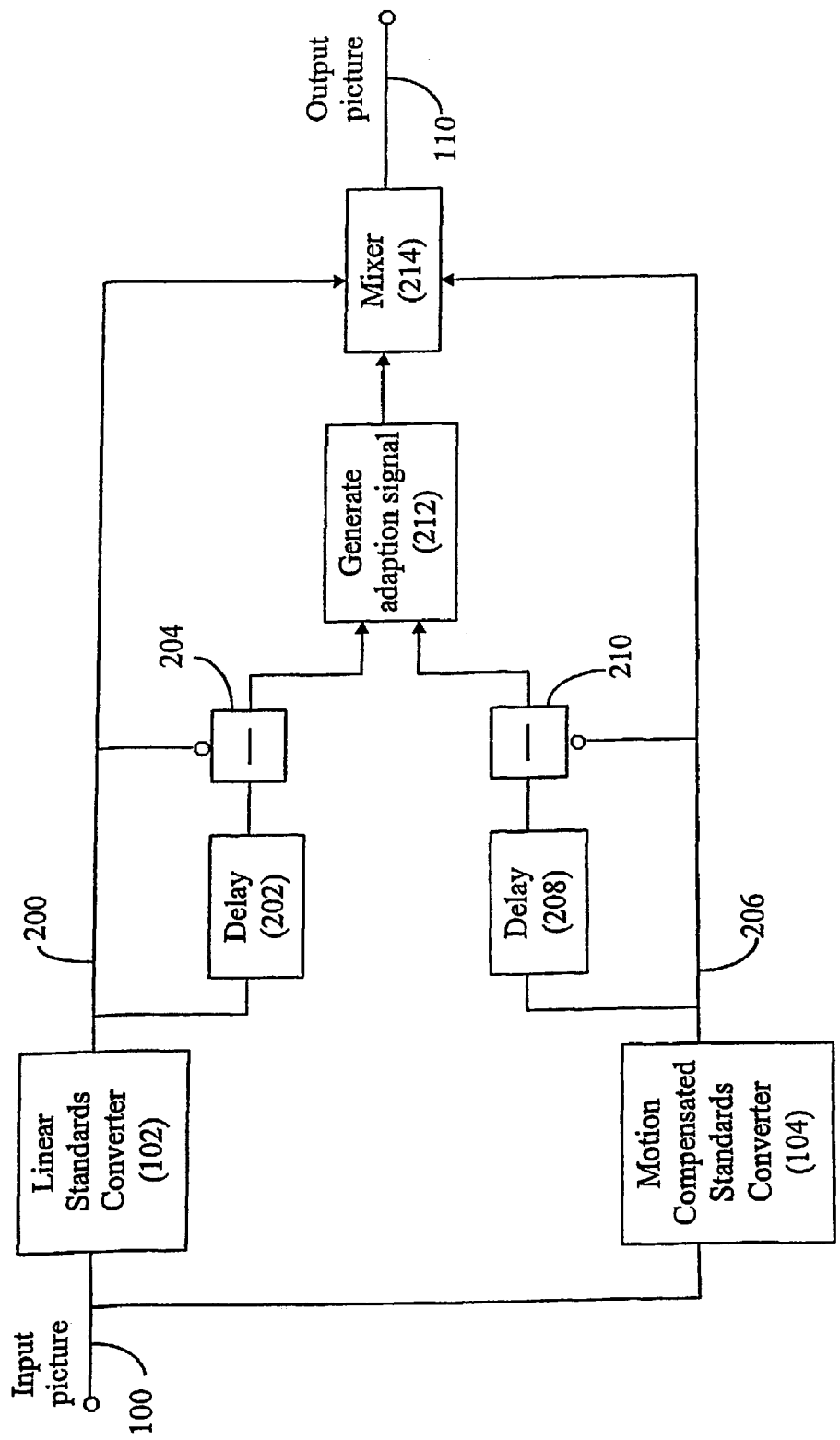
FIG. 2 is a block diagram of apparatus according to another embodiment of the present invention.

In another embodiment, shown in FIG. 2, the video input (100) is passed to the linear standards converter (102) and to the motion compensated standards converter (104). The output of the linear conversion (200) is then passed to a delay (202). The output (200) is then subtracted from the delayed signal at block (204), producing a difference or error signal between the current picture and the previous picture. A similar difference signal is calculated from the output of the motion compensated converter (206), through delay (208) and subtraction (210).

The two difference signals are then used in generator (212) to derive an adaption signal indicating the relative merits of the respective converter outputs for the current picture material. The two converter outputs (200 and 206) are then mixed (214) in the proportions suggested by the adaption signal to produce the output signal (110).

Figure 3:
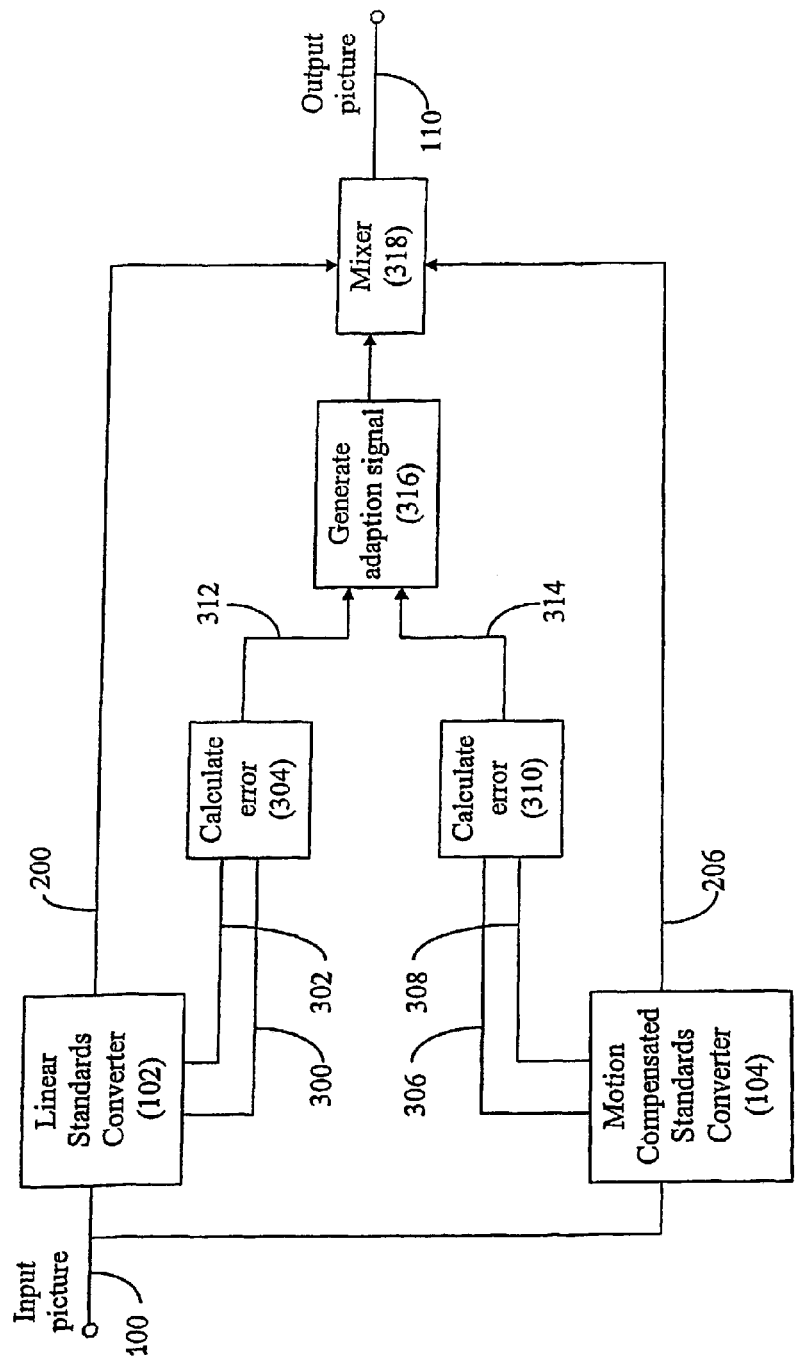
FIG. 3 is a block diagram of apparatus according to a further embodiment of the present invention.

In a further embodiment, illustrated in FIG. 3, the input (100) is again passed to converters (102) and (104). At this point, a comparison is made between the fields currently being converted (as opposed to those currently being output by the converter at 200). Thus two fields (300, 302), typically the current field and the field immediately preceding it, are taken from the linear converter (102) and an error signal is calculated at 304. This error gives a measure of how similar the fields are. Similarly, an error is calculated at 310 between two fields (306, 308) from the motion compensated converter (104). The two error signals (312, 314) are then compared at 316 in order to generate the adaption signal to control the mixer (318).

Thus in this embodiment, it is the comparison of the error signals which controls the mix. If the error between the fields currently being converted linearly is larger than those being converted with motion compensation, it will be preferable to use the motion compensated material to produce the output pictures (110). Similarly, if the error between the motion compensated fields is larger, the linear output is preferred.

Figure 4:
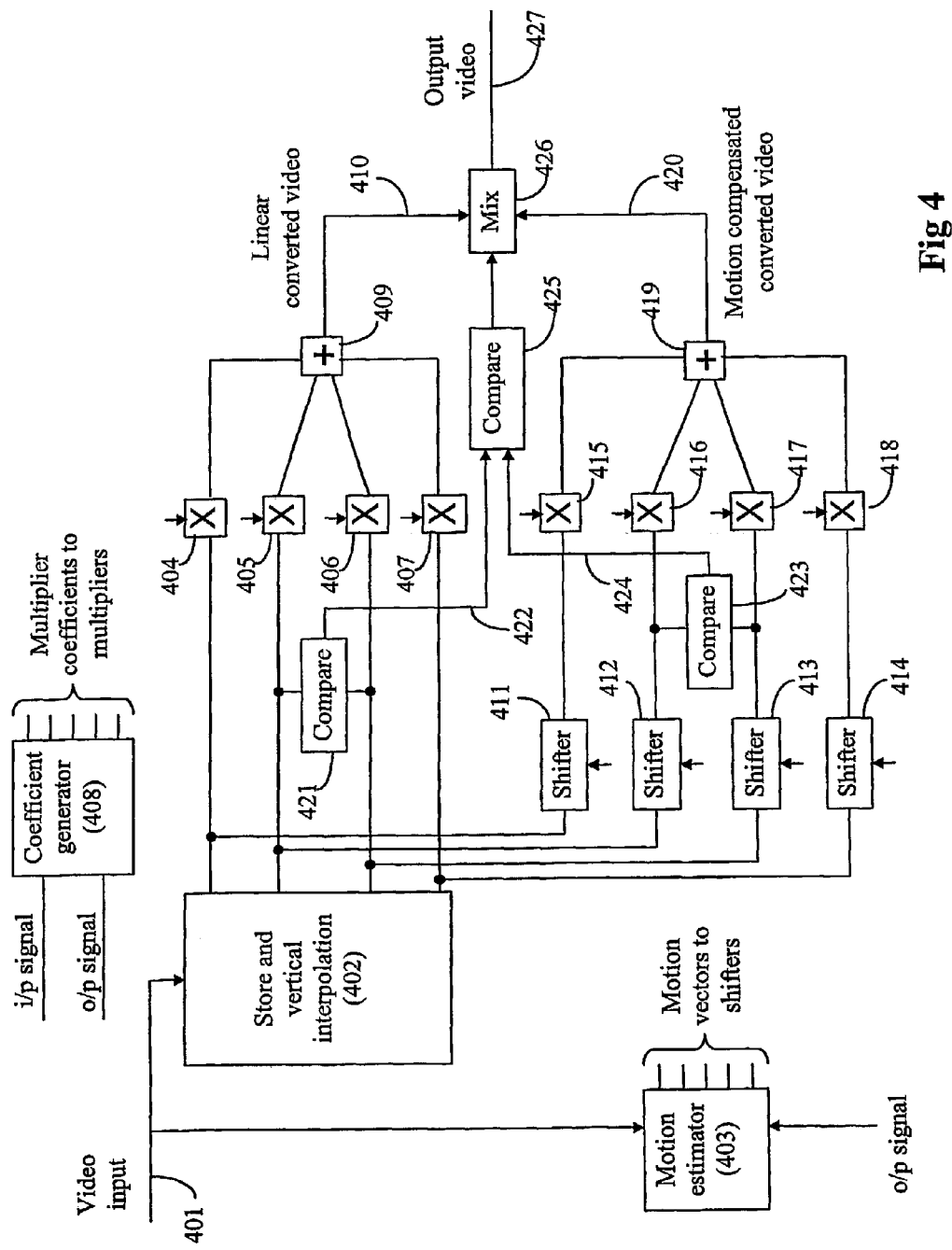
FIG. 4 is a block diagram of apparatus according to a still further embodiment of the present invention.

FIG. 4 shows a standards converter according to a further embodiment of the invention. An input video signal (401) is input to a store and vertical interpolation block (402) and a motion estimator (403). The block (402) outputs four vertically interpolated fields which are derived from the four input fields which straddle the temporal position of the required output field. Each of these output fields is derived by intra-field vertical interpolation of the corresponding input field, has the required number of lines for the intended output standard, and is vertically aligned with the required output line position.

These four fields are fed to respective coefficient multipliers (404) to (407) where they are weighted in known manner according to temporal interpolation coefficients from a coefficient generator (408) and summed (409) so as to generate a linearly standards converted signal (410).

The four fields from the block (402) are also fed to respective picture shifters (411) to (414) where they are motion compensated in known manner to the temporal position of the required output field by motion vectors from the motion estimator (403). The shifted fields are then weighted by the multipliers (415) to (418) and combined in the adder (419) to produce motion-compensated, converted signal (420).

The two central fields of the linear converter are compared in the comparator (421) to produce a "linear conversion error signal" (422); and the two central motion compensated fields are compared in the comparator (423) to produce a "motion compensated converter error signal" (424).

The error signals (422) and (424) are compared with each other in a comparator (425) which produces an adaptation control signal to control the mixer (426), which derives the output signal (427) by crossfading between the linearly converted signal (410) and the motion-compensated signal (420). The control is such as to favour the linear signal when the error signal (424) is large with respect to the error signal (422) and vice versa.

In the above description the same four vertically-converted signals from the block (402) are used for the linear conversion, the motion-compensated conversion and for the generation of the error signals. However, alternative embodiments advantageously use different vertical interpolation characteristics (i.e. different coefficients and/or different numbers of lines) for these three different functions. For example, the signals feeding the comparators could be optimised for the control of the adaptation process, and the signals feeding the converters could be optimised to reduce the visibility of conversion artefacts.

It should be noted that though in the example illustrated, the error signals are calculated using only two fields, in other embodiments any number of fields may be used (for example, four, from a four-field standards converter).

It should be understood that this invention has been described by way of examples only and that numerous modifications are possible without departing from the scope of the invention. For example, there is no restriction on the motion compensated method used.

This technique can be applied to standards conversion but would be equally applicable in other areas where motion detection is useful. These include prediction based compression systems, interpolators and noise reducers.

The techniques disclosed and claimed in this patent application can with advantage be combined with any of the techniques disclosed and claimed in the co-pending patent application PCT/GB01/01328 in the name of the same applicant.

What is claimed is:

1. A method of video processing comprising the steps of:
   receiving an input signal;
   conducting a motion compensated video process on the input signal to form a motion compensated signal;
   conducting an equivalent linear process on the input signal to form a linear signal;
   forming a measure of relative errors in the motion compensated process and the linear process respectively; and
   utilising said measure to form an output signal which is a mix between the motion compensated signal and the linear signal, the relative proportions of the motion compensated signal and linear signal in said mix being determined by said measure.

2. A method according to claim 1, wherein said measure of relative errors is formed by forming a first error signal from the output of the motion compensated process and by forming a second error signal from the output of the linear process.

3. A method according to claim 2, wherein the first error signal is formed by forming a first difference signal between pictures in the motion compensated process, and the second error signal is formed by forming a second difference signal between pictures in the linear process.

4. A method according to claim 3, wherein said measure is formed by comparing the first and second error signals.

5. A method according to claim 2, wherein said measure is formed by comparing the first and second error signal.

6. A method according to claim 1, wherein the motion compensation process comprises phase correlation.

7. A method of video processing comprising the steps of:
   conducting a motion compensated process on an input signal;
   conducting an equivalent linear process on the input signal;
   forming a first error signal from an output of the motion compensated process;
   forming a second error signal from an output of the linear process; and
   utilising the error signal to form a mix between the output of the motion compensated process and the output of the linear process.

8. A method according to claim 7, wherein the motion compensation process comprises phase correlation.

9. A method of video processing comprising the steps of conducting a motion compensated process on an input signal; conducting an equivalent linear process on the input signal; forming a first difference signal from pictures undergoing the motion compensated process, forming a second difference signal from pictures undergoing the linear process; comparing the first and second difference signals; and utilising the comparison to form a mix between the output of the motion compensated process end the output of the linear process.

10. A method according to claim 9, wherein the motion compensation process comprises phase correlation.

* * * * *

UNITED STATES PATENT AND TRADEMARK OFFICE
CERTIFICATE OF CORRECTION

| | | |
|---|---|---|
| PATENT NO. | : 7,009,656 B2 | Page 1 of 1 |
| APPLICATION NO. | : 10/220437 | |
| DATED | : March 7, 2006 | |
| INVENTOR(S) | : Thomson et al. | |

It is certified that error appears in the above-identified patent and that said Letters Patent is hereby corrected as shown below:

Title Page
Item[30], Foreign Application Priority Data section is missing, please add and include
--April 7, 2000 (DE)..............0008655.3
   September 7, 2000 (DE).......0021980.5--.

Column 4
Line 31, please replace "signal" with --signals--.
Line 43, please replace "signal" with --signals--.

Signed and Sealed this

Twenty-seventh Day of March, 2007

JON W. DUDAS
*Director of the United States Patent and Trademark Office*